United States Patent [19]

Shiga et al.

[11] Patent Number: 5,679,994
[45] Date of Patent: Oct. 21, 1997

[54] ELECTRIC ROTATING MACHINE WITH IMPROVED CYLINDRICAL MAGNET RETAINER

[75] Inventors: Tsutomu Shiga, Nukata-gun; Nobuyuki Hayashi, Nagoya; Masanori Ohmi, Anjo; Masami Niimi, Handa, all of Japan

[73] Assignee: Nippondenso Co., Ltd., Kariya, Japan

[21] Appl. No.: 369,073

[22] Filed: Jan. 5, 1995

[30] Foreign Application Priority Data

Oct. 5, 1994 [JP] Japan .................. 6-241139

[51] Int. Cl.$^6$ .................. H02K 23/04; H02K 21/06
[52] U.S. Cl. .................. 310/154; 310/89; 310/154; 310/156
[58] Field of Search .................. 310/154, 156, 310/254, 89; 29/596

[56] References Cited

U.S. PATENT DOCUMENTS

| | | | |
|---|---|---|---|
| 4,372,035 | 2/1983 | McMillen | 29/596 |
| 4,707,630 | 11/1987 | Tomite et al. | 310/154 |
| 4,850,100 | 7/1989 | Stokes | 29/596 |
| 5,105,114 | 4/1992 | Sickle et al. | 310/154 |
| 5,201,111 | 4/1993 | Prohaska | 29/596 |
| 5,475,276 | 12/1995 | Shiga et al. | 310/154 |

FOREIGN PATENT DOCUMENTS

| | | |
|---|---|---|
| 61-10950 | 1/1986 | Japan . |
| 61-218349 | 9/1986 | Japan . |

OTHER PUBLICATIONS

Patent Abstract of Japan, vol. 16 No. 279 (E-1220), Jun. 1992 re JP-A 04067756.
Patent Abstract of Japan, vol. 11 No. 59 (E-482) [2506] Feb. 1987 re JP-A 61218349.
Patent Abstract of Japan, vol. 10 No. 150 (E-408) [2207] May 1986 re JP-A 61010950.
Patent Abstract of Japan, vol. 11 No. 27 (E-474) [2474] Jan. 1987 re JP-A 61196747.
Patent Abstract of Japan, vol. 10 No. 379 (E-465) [2436] Dec. 1986 re JP-A 61170260.

*Primary Examiner*—Steven L. Stephan
*Assistant Examiner*—Tran Ngoc Nguyen
*Attorney, Agent, or Firm*—Cushman, Darby & Cushman IP Group of Pillsbury Madison & Sutro LLP

[57] ABSTRACT

An electric rotating machine and manufacturing method of the same is provided that can securely press-fit magnetic poles against an inner circumference of a yoke with a cylindrical body. By directly contacting a first and second end portions of the cylindrical body and moving the same relatively, the diameter of the cylindrical body widens in the outer radial direction to press-fit the magnetic poles against the inner circumference of the yoke. Thus, the variation of the inner diameter of the magnetic poles that occurs due to the dimensional error in permanent magnet thickness and inner diameter of the yoke is absorbed by the relative movement of the first and second end portions. This stabilizes the fixing force of the magnet, and allows the magnet to be securely fixed to the yoke without excessive stress on the cylindrical body. Furthermore, the displacement of the magnetic poles can be restricted by bending axial ends of the cylindrical body radially outwardly.

9 Claims, 4 Drawing Sheets

ELECTRIC ROTATING MACHINE WITH IMPROVED CYLINDRICAL MAGNET RETAINER

CROSS REFERENCE TO RELATED APPLICATION

This application is based upon and claims priority of Japanese Patent Application No. 6-241139 filed Oct. 5, 1994, the content of which is incorporated herein by reference.

BACKGROUND OF THE INVENTION

1. Field of the Invention

The present invention relates to an electric rotating machine for starter motor and a manufacturing method of the same. More particularly, the present invention relates to a stator structure and its manufacturing method.

2. Related Art

It is known, by Japanese Laid-open Patent No. 61-10950, to manufacture a stator of an electric rotating machine by a method of fixing permanent magnets as magnetic poles onto a yoke by rounding an elastic copper band to a cylindrical body and butting it in the circumferential end and pressing it in, to fix the permanent magnets onto the inner circumference of the yoke.

With the conventional structure and method, the circumferential end portion of the cylindrical body is butted and projected between the space between the permanent magnets. The inner diameter of the magnetic poles fluctuates according to the magnet thickness and dimensional error of the inner diameter of the yoke, so the tension force of the butt portion may be insufficient, the pressing force of the magnet onto the yoke by the cylindrical body may drop, and the stress of the portion projected between the permanent magnets may become excessive.

SUMMARY OF THE INVENTION

In view of the above problem, the present invention has a primary object to provide an electric rotating machine in which permanent magnets as magnetic poles are accurately press-fit to an inner circumference of a cylindrical yoke by a cylindrical body, and to provide a manufacturing method of the same.

According to the present invention, a first and second end portions of a cylindrical body are directly contacted to each other and moved relatively in a generally axial direction so that a diameter of the cylindrical body widens in an outer radial direction to press-fit permanent magnets as magnetic poles to a cylindrical yoke. Thus, fluctuation of the inner diameter of the magnetic poles that occurs due to the dimensional error in the magnet thickness and inner diameter of the yoke is absorbed by the relative movement of the first and second end portions. This stabilizes the permanent magnet's fixing force, and allows the permanent magnets to be securely fixed without excessive stress on the cylindrical body.

Preferably, the axial end portion of the cylindrical body is bent radially outwardly toward the magnet side so that the permanent magnets can be securely fixed to the yoke.

Preferably, at least one of the first and second end portions is shaped in an arc form to reduce the direct contact length of the first and second end portions, while securely widening the diameter of the cylindrical body.

Preferably, by the arc shape of one of the first and second end portions, the first and second end portions can be directly contacted near the center of the axis line of the other of the first and second end portions. Thus, the torsion of the cylindrical body during assembly is reduced, and the circumferential tension force is stabilized.

More preferably, a guide portion is formed in the first end portion to prevent protrusion of the second end portion in the inner circumferential direction.

More preferably, the first end portion is bent for the guide portion so that the number of component parts does not increase, and manufacturing cost is made inexpensive.

DETAILED DESCRIPTION OF THE PRESENTLY PREFERRED EMBODIMENTS

Figure 1:
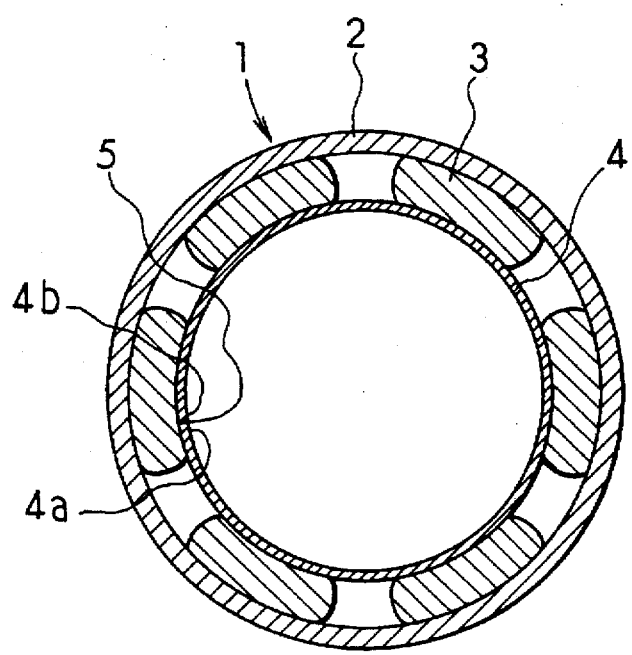
FIG. 1 is a cross-sectional view illustrating a stator of an electric rotating machine according to the first embodiment of the present invention.

The present invention will be described in detail with reference to various embodiments illustrated in the drawings in which only stator structures of an electric rotating machine are illustrated for brevity and same reference numerals are used to designate the same or like parts.

Figure 2:
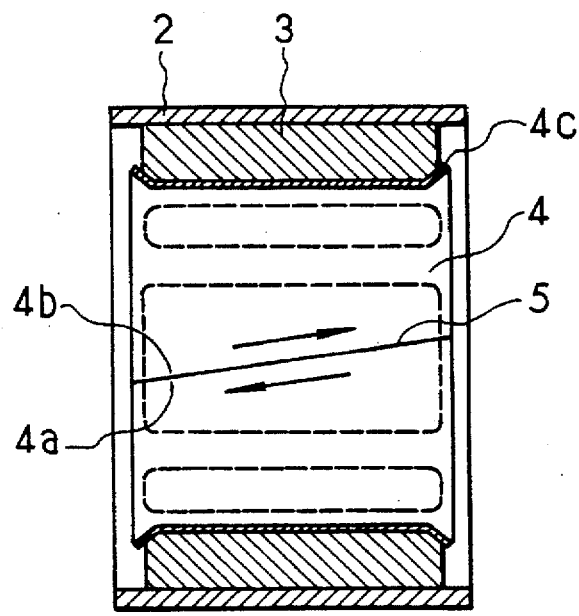
FIG. 2 is a side cross-sectional view illustrating the stator illustrated in FIG. 1.

The first embodiment of the present invention illustrated in FIGS. 1 and 2. In a stator of an electric rotating machine 1, a plurality of magnetic poles 3 composed of permanent magnets are set in an inner circumference of a cylindrical yoke 2. A cylindrical body 4 is set at an inner circumference of the magnetic poles 3 circumferentially and press-fits the magnetic poles 3 to the inner circumference of the cylindrical yoke 2. The cylindrical body 4 is formed by rounding band-shaped sheet metal having sloped or inclined free ends, a first and second end portions 4a and 4b. As shown in FIG. 2, the first and second end portions 4a and 4b in the circumferential direction of the cylindrical body 4 are directly contacted by butting, and are formed in a shape to inversely incline or slope toward a yoke axial line. The butting portion 5 of the first and second end portions 4a and 4b directly contact the inner circumference of the magnetic poles 3 when butted, and deviation and removal in the outer circumferential direction are prevented during butting.

Next, an assembly method or manufacturing method of the stator according to the present invention will be explained. After setting the multiple magnetic poles 3 on the inner circumference of the yoke 2 at a specified pitch, the cylindrical body 4 made of the band-shaped metal having inclined free ends and rounded to be slightly larger than the inner diameter of the magnetic poles 3 is inserted in the axial direction so that the first and second end portions 4a and 4b directly contact each other. While directly contacting the first and second end portions 4a and 4b and shifting or sliding the cylindrical body 4 in the axial direction (direction of arrow shown in FIG. 2), the diameter of the cylindrical body 4 widens, and securely press-fits the magnetic poles 3 against the inner circumference of the yoke 2. After an adequate tension force is given to the cylindrical body 4, the axial end portions 4c are bent radially outwardly toward the magnetic poles 3. This positions the magnetic poles 3 in the axial direction and securely fixes them to the yoke 2.

Since the cylindrical body 4 is formed by rounding band-shaped sheet metal and the first and second end portions 4a and 4b are contacted in the circumferentially rounded state, the magnetic poles 3 are securely press-fit to the inner circumference of the yoke 2 when the cylindrical body diameter is widened by shifting the end portions 4a and 4b in the axial direction. Thus, the variations in the inner diameter of the magnetic poles 3 that occurs due to the dimensional error in the permanent magnet thickness and inner diameter of the yoke 2 is tolerated or absorbed by the adjustment of the contact of the first and second end portions 4a and 4b. Thus, an excessive stress is not applied on the cylindrical body 4, and the magnetic poles 3 can be securely fixed to the yoke 2. As the band-shaped sheet metal is used for the cylindrical body 4, there are cost-wise advantages. Furthermore, as plasticity machining to project the cylindrical body 4 between the magnetic poles 3, material with a small elongation and large strength can be used, thereby increasing the fixing strength of the magnetic poles 3. This is advantageous for the electric rotating machine used in automotive starters, etc., which require a high vibration-resistance.

Furthermore, as the absorption effect of the dimensional error in the inner diameter of the magnetic poles 3 caused by errors in the permanent magnetic thickness or the like and inner diameter of the yoke 2, etc., is large, the error standards can be further relaxed, and the parts costs can be reduced greatly. Furthermore, adhesives can be used to fix the magnetic poles 3 to the yoke 2 in this embodiment.

Figure 3:
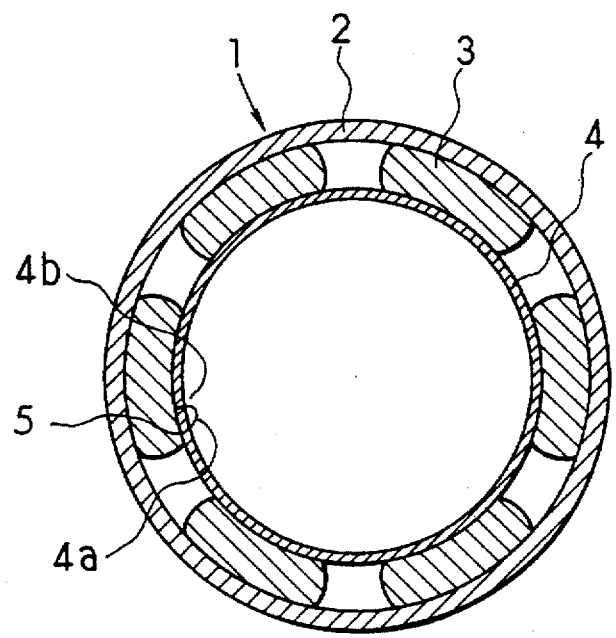
FIG. 3 is a cross-sectional view illustrating a stator according to the second embodiment.
Figure 4:
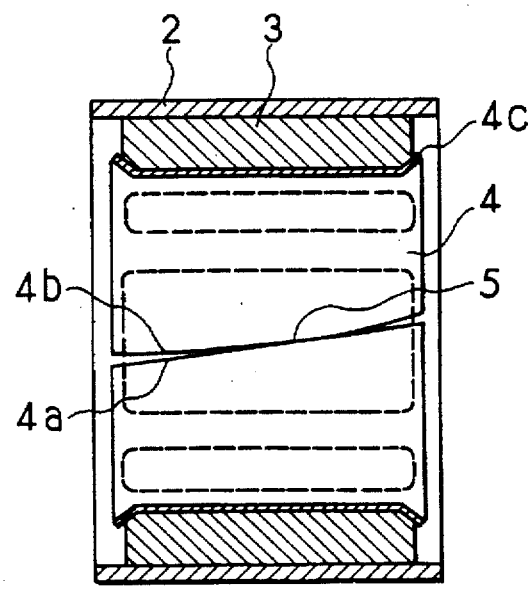
FIG. 4 is a side cross-sectional view illustrating the stator illustrated in FIG. 3.

The second embodiment is illustrated in FIGS. 3 and 4. Of the first and second end portions 4a and 4b of the cylindrical body 4, the first end portion 4a is formed in a linear or straight shape and the second end portion 4b is formed as an inclined arc shape. By forming the second end portion 4b as an arc shape, the position that the second end portion 4b directly contacts the first end portion 4a is near the center of the axial direction of the first end portion 4a. Thus, the torsion of the cylindrical body 4 during assembly is reduced, and the circumferential tension force is made stable.

In this embodiment, the first end portion 4a is formed as a linear shape, but this portion can be formed in an arc shape as with the second end portion 4b, and the position that the second end portion 4b directly contacts the first end portion 4a can be near the center of the axial direction of the first end portion 4a as well.

Figure 5:
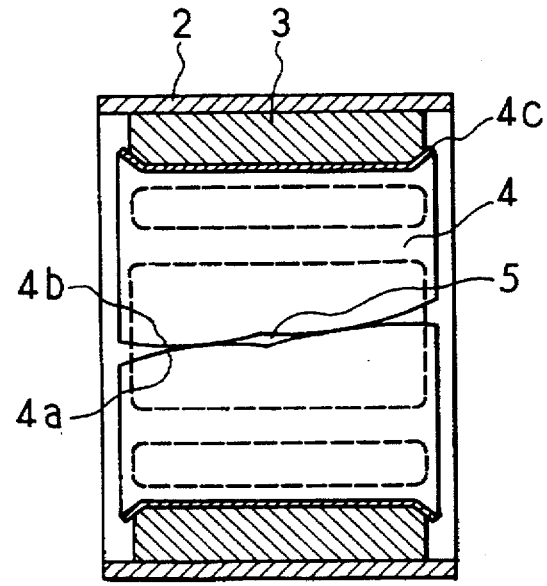
FIG. 5 is a cross-sectional view illustrating a modification of the stator illustrated in FIG. 3.

In the above embodiment, an arc shape is used for the first or second end portion 4a or 4b so that it will project near the center of the axial direction. However, as illustrated in FIG. 5, two arc shapes can be formed for the first or second end portion 4a or 4b so that the first and second end portions 4a and 4b directly contact each other only partly, at the two direct contact positions instead of near the center of the axial direction. It is to be noted that two or more random contact positions cannot be formed.

Figure 6:
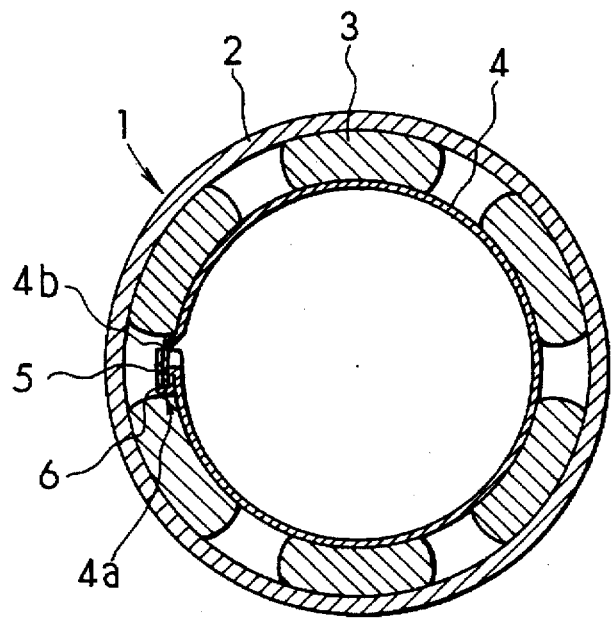
FIG. 6 is a cross-sectional view illustrating a stator according to the third embodiment.
Figure 7:
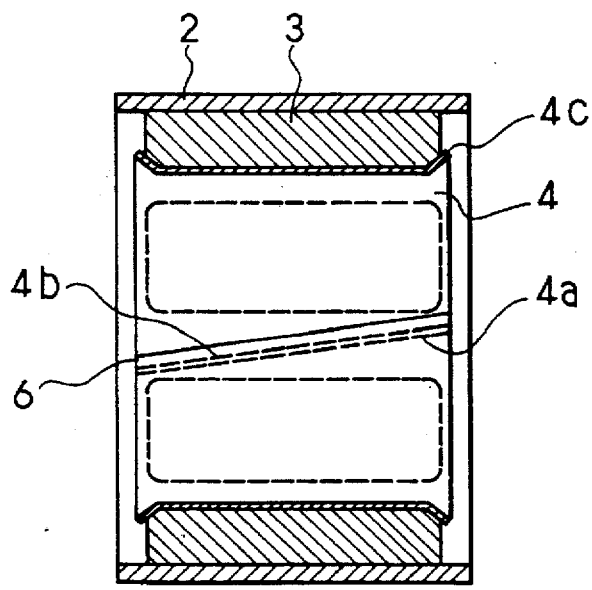
FIG. 7 is a side cross-sectional view illustrating the stator illustrated in FIG. 6.

FIGS. 6 and 7 illustrate the third embodiment of the present invention. A fold-back portion 6 that acts as a U-shaped guide portion is formed by bending the first end portion 4a of the cylindrical body 4. The second end portion 4b is sandwiched by this fold-back portion 6. This allows the displacement of the butt portion 5 in the inner and outer circumferential directions, and allows the magnetic poles 3 to be firmly fixed. In this case, the fold-back potion 6 prevents the magnetic poles 3 from projecting from the inner surface, and thus is placed between two adjacent magnetic poles 3.

Figure 8:
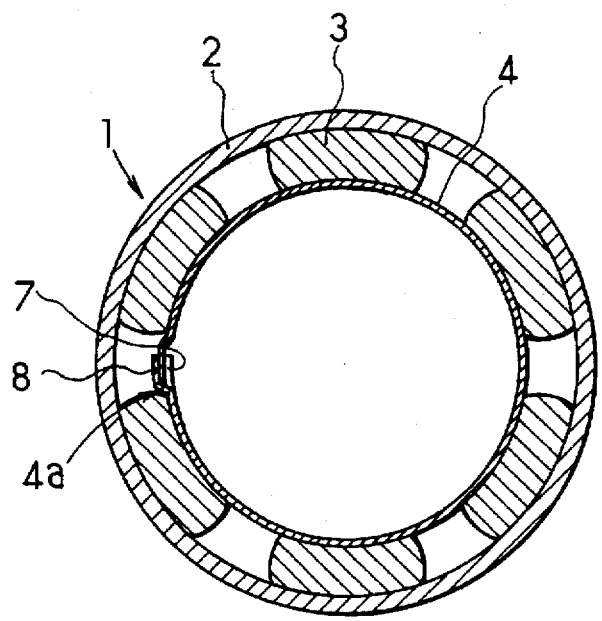
FIG. 8 is a cross-sectional view illustrating a stator according to the fourth embodiment.
Figure 9:
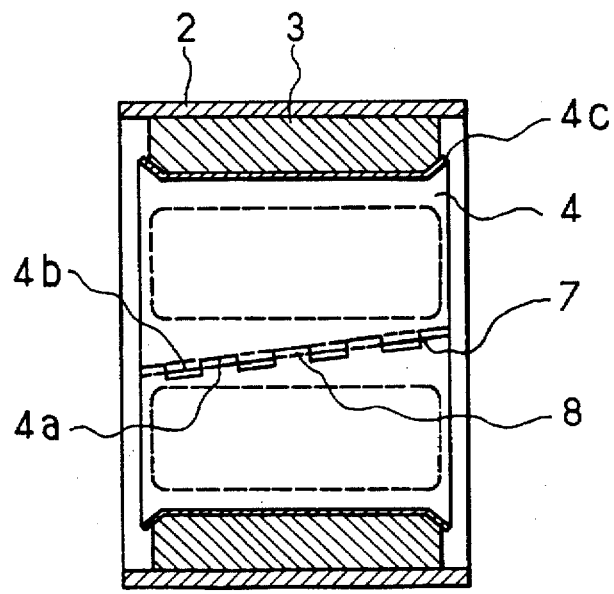
FIG. 9 is a cross-sectional view illustrating the stator illustrated in FIG. 8.

FIGS. 8 and 9 illustrate the fourth embodiment of the present invention. Multiple grooves or cut portions 7 are cut on the free end of the first end portion 4a, and the U-shaped guide portion similar to the third embodiment is structured with the multiple bend portions 8 formed between the grooves 7. This allows the radial direction thickness of the fold-back portion in the third embodiment to be reduced.

The present invention has been described with reference to the presently preferred embodiments. However, it should be understood that the foregoing description is not restrictive and the present invention may be modified in many ways without departing from the scope and spirit of the invention.

What is claimed is:

1. An electric rotating machine comprising:
   a cylindrical yoke;
   magnetic poles laid on an inner circumference of said cylindrical yoke; and
   a cylindrical body made of a material with a small elongation and a large strength and placed on an inner circumference of said magnetic poles, said cylindrical body having first and second end portions inclined with respect to a central axis thereof and contacting each other while pressing said magnetic poles to said inner circumference of said cylindrical yoke, wherein at least one of said first end portion and said second end portion of said cylindrical body is formed in an arc shape projecting toward an opposing end portion.

2. An electrical rotating machine comprising:
   a cylindrical yoke;
   magnetic poles laid on an inner circumference of said cylindrical yoke; and
   a cylindrical body made of a material with a small elongation and a large strength and placed on an inner circumference of said magnetic poles, said cylindrical body having first and second end portions inclined with respect to a central axis thereof and contacting each other while pressing said magnetic poles to said inner circumference of said cylindrical yoke, wherein said first end portion has a guide portion to sandwich and guide said second end portion.

3. The electric rotating machine according to claim 1 wherein said first and said second end portions are positioned to an inner circumference of one of said magnetic poles.

4. The electric rotating machine according to claim 1, 2 or 3, wherein said cylindrical body has an axial end portion bent radially outwardly toward said magnetic poles to position said magnetic poles axially.

5. The electric rotating machine according to claim 1, wherein said first end portion is formed in a linear shape, said second end portion is formed in said arc shape, and said second end portion contacts said first end portion near the axial center of said first end portion.

6. The electric rotating machine according to claim 2, wherein said guide portion is formed by bending said first end portion in a U-shape and is arranged between adjacent two of said magnetic poles.

7. The electric rotating machine according to claim 2, wherein said first end portion is formed with a plurality of cuts.

8. The electric rotating machine according to claim 1, 2 or 3, wherein said magnetic poles are arranged circumferentially with a spacing between circumferentially adjacent poles, and said cylindrical body extending circumferentially at a substantial uniform radius at said magnetic poles and said spaces.

9. The electric rotating machine according to claim 1, 2 or 3, wherein an axial position of said first and said second end portions is so set that all of said magnetic poles tightly contact said yoke and said cylindrical body.

* * * * *